Nov. 8, 1960   R. MATTHEY ET AL   2,958,998
SHOCK ABSORBING BEARING FOR TIMEPIECES
Filed Dec. 16, 1959
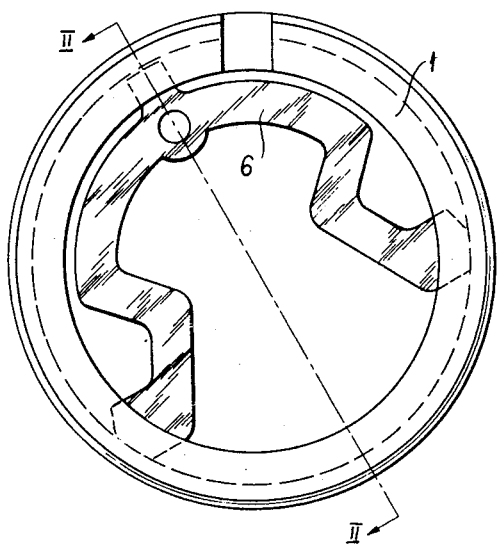
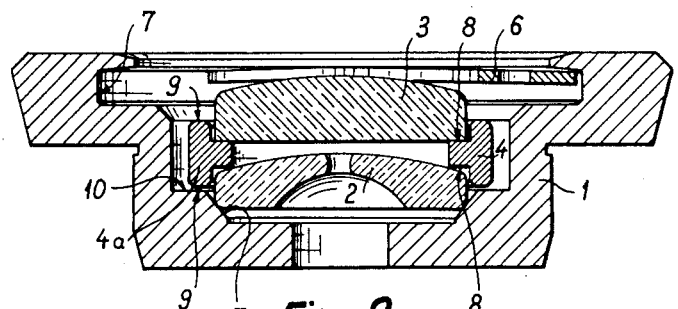
INVENTORS
ROGER MATTHEY and
CHARLES EMILE SCHLATTER
BY
ATTORNEY

United States Patent Office 2,958,998
Patented Nov. 8, 1960

2,958,998
SHOCK ABSORBING BEARING FOR TIMEPIECES

Roger Matthey, Le Sentier, and Charles Emile Schlatter, Les Brenets, Switzerland, assignors to Seitz & Co., Les Brenets, Switzerland, and Parechoc S.A., Le Sentier, Switzerland, both firms of Switzerland Filed Dec. 16, 1959, Ser. No. 859,880

Claims priority, application Switzerland Dec. 18, 1958

2 Claims. (Cl. 58—140)

The present invention relates to a shock-absorbing bearing for timepieces, comprising a support having two annular centering surfaces, one of which is plane and perpendicular to the axis of the bearing, while the other is a surface of revolution, and with which there co-operates a bearing body.

The said bearing is characterized by the fact that its body consists of a bearing member bearing directly on the said surface of revolution by means of an end stone on which there acts a resilient return device, and of a ring having two coaxial seats of equal diameter and of equal depth, either one of which is intended to receive the bearing member and the other the end stone, the said bearing member and the said end stone being of equal diameter and engaging freely therein, while the two faces of the said ring have an addition a plane annular surface, of which the one situated opposite the said plane surface of the support co-operates with the latter surface to return the bearing body to its inoperative position.

The drawing illustrates by way of example one embodiment of the invention.

Fig. 1 is a plan view of a bearing for a balance staff of a clockwork movement, the bearing body being omitted, and Fig. 2 is a section through the complete bearing along the line II—II of Fig. 1 to an enlarged scale.

The bearing illustrated comprises a support 1 intended to be forced into a cock (not shown) of a clockwork movement. The said support 1 is formed with a central recess in which is disposed a bearing body consisting of a pierced stone or bearing member 2, an end stone 3 and a ring 4. The pierced stone and the end stone are both cylindrical and are of equal diameter.

The pierced stone rests directly on a frusto-conical centering surface 5 formed in the support 1. The return spring 6, partially engaged in annular groove 7 in the support 1, bears on the end stone 3 to return the bearing body into the central position following upon displacements due to shocks to which the staff of the balance (not shown) may be subjected.

The ring 4 has midway along its height a shoulder 4a extending radially inwards and forming a cross-member between the pierced stone 2 and the end stone 3. The said shoulder thus provides two seats 8 of equal depth and of equal diameter, in which the two stones are freely engaged. Due to the fact that the said two seats are identical, the ring may be disposed in either of two positions inverted in relation to one another. Finally, each of the faces of the ring 4 has a plane annular surface 9, either one of which, depending upon the position occupied by the ring, is adapted to co-operate with a plane annular centering surface 10 on the bearing support 1.

The bearing according to the present invention has the advantage that it operates reliably while being of low cost, since the two stones are freely engaged in the ring and are not driven therein, while the fact that the ring is reversible further facilitates the assembly.

The form of the return spring 6 may differ from that of the spring illustrated.

It is to be noted that, in the return of the bearing body into the inoperative position, the surface 5 ensures centering of the bearing body, while the surface 10 ensures that it is returned into the correct vertical position.

What we claim is:

1. In a shock-absorbing bearing for timepieces, comprising a support having two annular centering surfaces, one of which is plane and perpendicular to the axis of the bearing, while the other is a surface of revolution, with which surfaces there co-operates a bearing body, a bearing member resting directly on the said surface of revolution, an end stone, a resilient return device, acting on said end stone, and a ring having two coaxial seats of equal diameter and of equal depth, either one of which is intended to receive indifferently the bearing member or the end stone, the said bearing member and the said end stone being of equal diameter and engaging freely in said ring, while the two faces of the said ring have in addition a plane annular surface, of which the one situated opposite the said plane surface of the support co-operates with the latter surface to bring the bearing body to its rest position.

2. Bearing as claimed in claim 1, in which the said seats of the ring are separated by an internal shoulder which forms a cross-piece between the bearing member and the end stone.

References Cited in the file of this patent
FOREIGN PATENTS

| 295,738 | Switzerland | Mar. 16, 1954 |
| 1,079,502 | France | May 19, 1954 |
| 325,895 | Switzerland | Jan. 15, 1958 |
| 328,802 | Switzerland | May 14, 1958 |